United States Patent
Heinz et al.

[11] Patent Number: 6,086,091
[45] Date of Patent: Jul. 11, 2000

[54] SIDE IMPACT PROTECTION DEVICE FOR AN OCCUPANT OF A VEHICLE

[75] Inventors: Martin Heinz, Stuttgart; Fred Trick, Rutesheim; Herbert Bögge, Wiernsheim; Günter Dietrich, Frieberg; Hermann Guhl, Rottenburg, all of Germany

[73] Assignee: Dr. Ing. h.c.F. Porsche AG, Weissach, Germany

[21] Appl. No.: 09/079,389

[22] Filed: May 15, 1998

[30]    Foreign Application Priority Data

May 16, 1997  [DE]   Germany ............................ 197 20 585

[51] Int. Cl.⁷ ............................ B60R 21/20; B60R 21/16
[52] U.S. Cl. ..................... 280/728.3; 280/730.2; 280/728.2
[58] Field of Search ................. 280/730.2, 736, 280/728.2, 727, 728.3, 731; 296/202

[56]            References Cited

U.S. PATENT DOCUMENTS

| | | | |
|---|---|---|---|
| 5,062,664 | 11/1991 | Bishop et al. | 280/743 |
| 5,224,732 | 7/1993 | Warner et al. | 280/730 |
| 5,275,432 | 1/1994 | Pray et al. | 280/728.1 |
| 5,536,041 | 7/1996 | Acker et al. | 280/740 |
| 5,662,351 | 9/1997 | Phillion et al. | 280/728.3 |
| 5,692,774 | 12/1997 | Acker et al. | 280/729 |
| 5,906,390 | 5/1999 | Phillion et al. | 280/728.3 |

FOREIGN PATENT DOCUMENTS

| | | |
|---|---|---|
| 0 363 986 | 4/1990 | European Pat. Off. . |
| 0 523 704 | 1/1993 | European Pat. Off. . |
| 0 711 627 | 5/1996 | European Pat. Off. . |
| 33 15 535 | 3/1984 | Germany . |
| 41 01 286 | 7/1992 | Germany . |
| 43 09 925 | 10/1993 | Germany . |
| 42 14 662 | 11/1993 | Germany . |
| 43 11 241 | 4/1994 | Germany . |
| 94 08 908 | 1/1995 | Germany . |
| 44 36 130 | 3/1995 | Germany . |
| 44 10 889 | 10/1995 | Germany . |
| 44 30 412 | 12/1995 | Germany . |
| 195 11 511 | 2/1996 | Germany . |
| 295 17 372 | 3/1996 | Germany . |
| 44 43 027 | 6/1996 | Germany . |
| 195 05 214 | 8/1996 | Germany . |
| 296 08 055 | 8/1996 | Germany . |
| 195 35 430 | 3/1997 | Germany . |
| 2-310140 | 12/1990 | Japan .................................. 280/728.2 |
| 06 227348 | 8/1994 | Japan . |
| 2 293 355 | 3/1996 | United Kingdom . |

Primary Examiner—J. J. Swann
Assistant Examiner—Faye M. Fleming
Attorney, Agent, or Firm—Evenson, McKeown, Edwards & Lenahan, P.L.L.C.

[57]            ABSTRACT

A side impact protection device in the form of an inflatable gas bag for an occupant of a motor vehicle includes an outlet opening located on a vertical wall section of a trim part located in front, said opening being closed by a cover when the gas bag is in the resting position. The cover consists of an external frame part fastened to the adjoining trim part and at least two lid halves that are connected integrally with the external frame part. The pivotable lid halves are provided with a decorative covering on the side facing the passenger compartment. The covering has a tear seam located in front of the common connecting area of the lid halves.

15 Claims, 6 Drawing Sheets

SIDE IMPACT PROTECTION DEVICE FOR AN OCCUPANT OF A VEHICLE

CROSS-REFERENCE TO RELATED APPLICATIONS

This application is related to pending application Ser. No. 09/079,388 filed on May 15, 1998 in the name of Martin Heinz et al. for SIDE IMPACT PROTECTION DEVICE FOR AN OCCUPANT; pending application Ser. No. 09/080,207 filed on May 18, 1998 in the name of Martin Heinz et al. for SIDE IMPACT PROTECTION DEVICE FOR AN OCCUPANT; and pending application Ser. No. 09/080,248 filed on May 18, 1998 in the name of Martin Heinz et al. for SIDE IMPACT PROTECTION DEVICE FOR AN OCCUPANT; the subject matter of which is incorporated herein by reference.

BACKGROUND AND SUMMARY OF THE INVENTION

This application claims the priority of German application 197 20 585.2, filed in Germany on May 16, 1997.

The invention relates to a side impact protection device in the form of an inflatable gas bag for an occupant of a vehicle, with an outlet opening for the inflated gas bag being provided on a vertical wall section of a trim part located in front, said opening being closed by a cover when the gas bag is in the folded resting position.

German patent document DE 195 11 511 A1 teaches a side impact protection device for an occupant of a motor vehicle, with an installation module that is prefabricated and consists of a housing, a gas generator, and a folded gas bag being mounted on the interior door panel of a side door. An outlet opening is provided in the trim part located in front, said opening being closed by a cover when the gas bag is in the resting position. In this design, the cover, made in one piece, is fastened only to the gas bag. The disadvantage of this arrangement is that when the gas bag unfolds, the cover is moved toward the occupant to be protected, which can lead to injury under certain conditions. It is also difficult to position the installation module with the cover on the interior panel of the door in such fashion that a fixed circumferential gap is produced between the cover and the outlet opening on the trim part and the cover is aligned flush with the outer skin of the adjoining trim part.

A goal of the invention is to improve a cover for an outlet opening of a gas bag in such fashion that the cover, with the side impact protection device in the resting position, forms a functional and visual unit with the trim part and that when the gas bag unfolds, the cover cannot come in contact with the occupant to be protected.

According to the invention, this and other goals have been achieved by providing a side impact protection device for an occupant of a vehicle, comprising: an inflatable gas bag; a vertical wall section of a trim part defining an outlet opening for the gas bag; and a cover closing said outlet opening with the gas bag in a folded resting position, said cover including an outer frame part mounted on the trim part and at least two pivotable lid halves formed integrally with the outer frame part, said lid halves being provided on a side facing a passenger compartment with a decorative covering, a tear seam being provided in a common connecting area of said lid halves on the covering.

The primary advantages achieved with the invention are that the cover, which consists of an outer frame part and at least two lid halves that fit on top of one another and are integrally connected with the frame part when the side impact protection device is in the resting position, is always correctly positioned relative to the trim part and that when the gas bag unfolds, the pivotable lid halves do not come in contact with the occupant to be protected. The cover can be manufactured simply and economically. The lid halves are provided on the side facing the passenger compartment with a decorative covering made of leather, artificial leather, or a film, with a tear seam provided in a common connecting area of the two lid halves or of the cover.

According to certain preferred embodiments, the cover is made of a lightweight injectable material (SANTOPRENE™, a thermoplastic rubber, for example) by the injection molding process, with a weakened point between the surrounding outer frame part and the adjoining outer contour of the lid halves, at least areawise.

In the common connecting area of the two lid halves, the lid halves expand with a small space between them; at certain distances, narrow connecting ribs are provided between the adjoining lid halves. In order to ensure a specific pivoting movement of the two lid halves, thin-walled retaining panels are provided internally between the external frame part and the adjoining lid half, said panels being connected with the corresponding lid halves.

Other objects, advantages and novel features of the present invention will become apparent from the following detailed description of the invention when considered in conjunction with the accompanying drawings.

DETAILED DESCRIPTION OF THE DRAWINGS

Figure 1:
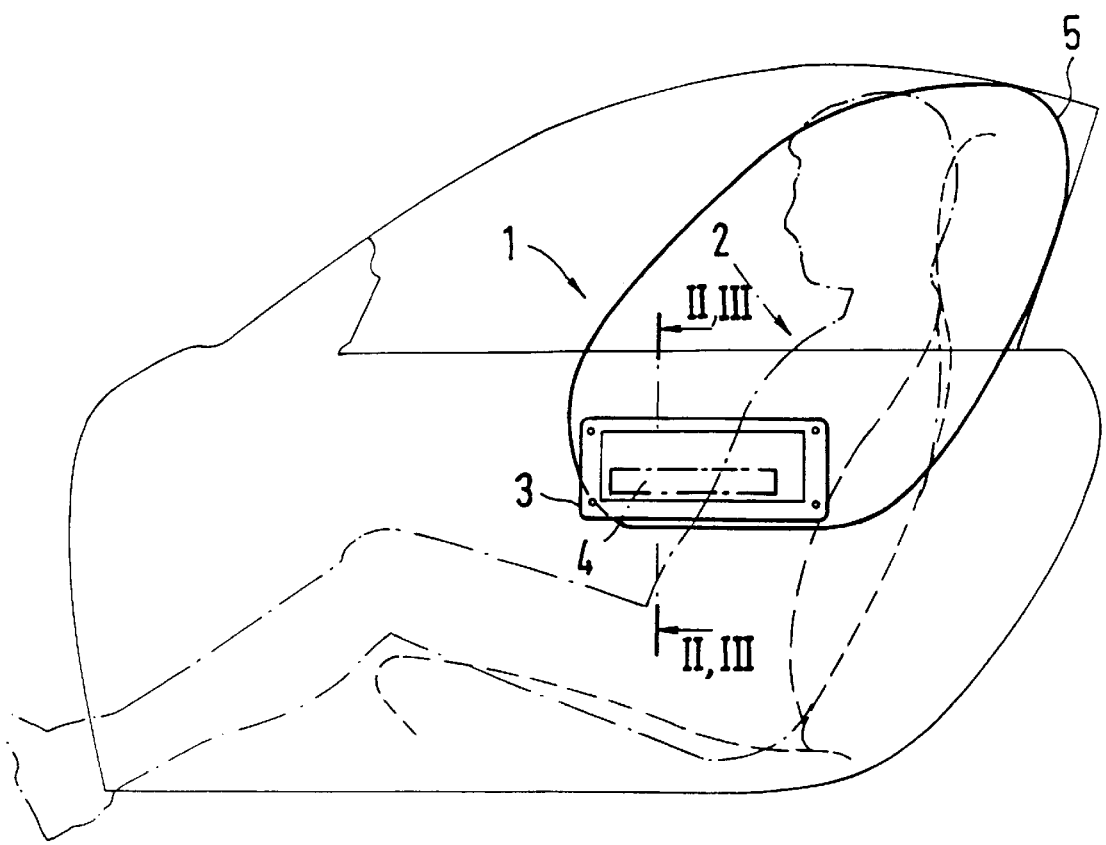
FIG. 1 is a partial side view of a side impact protection device for an occupant of a vehicle according to a preferred embodiment of the present invention.
Figure 2:
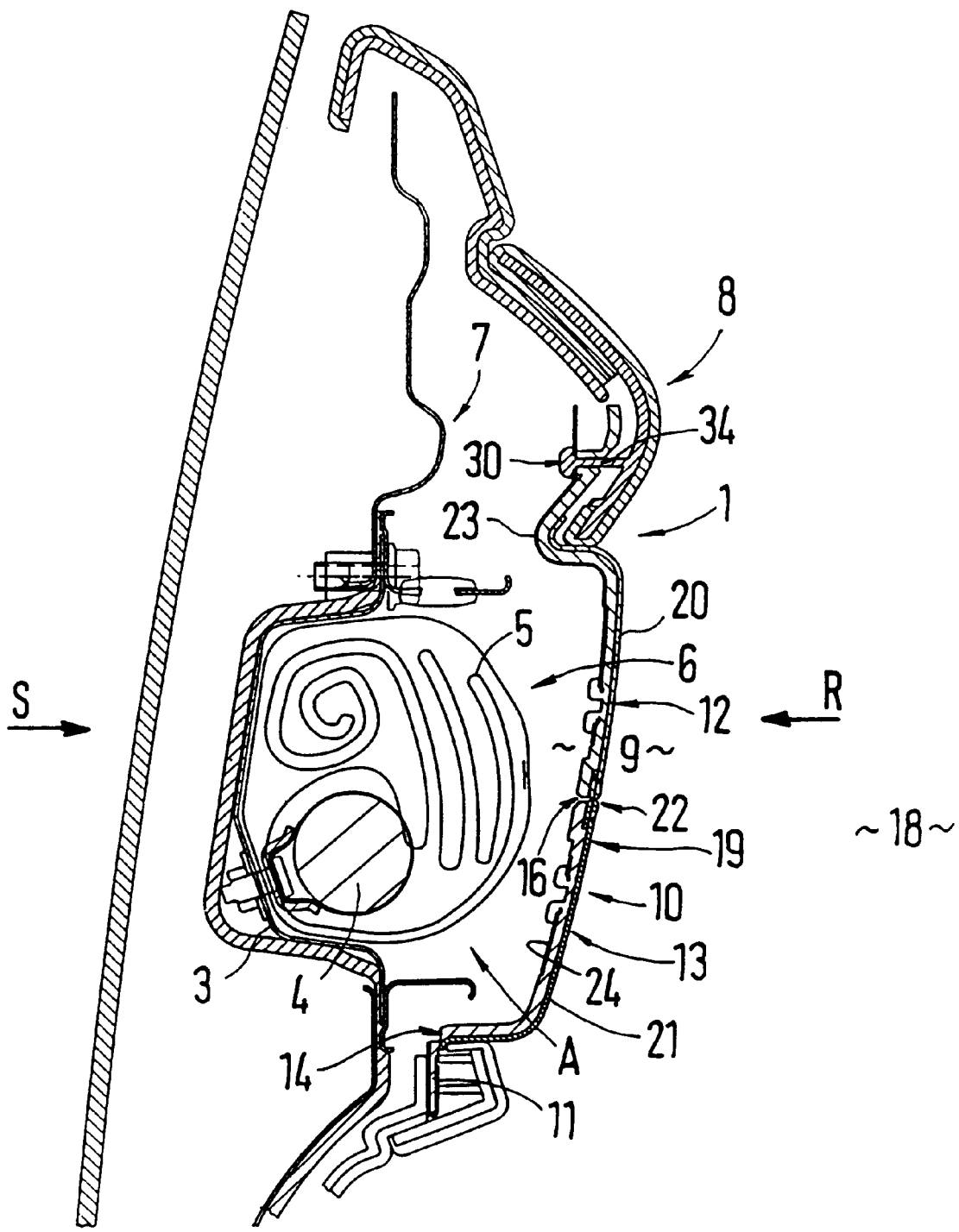
FIG. 2 is a section along line II—II in FIG. 1 with the side impact protection device in the resting position, shown enlarged.

A side impact protection device 1 for an occupant 2 comprises a housing 3, a gas generator 4, and a folded gas bag 5, with housing 3, gas generator 4 connected with housing 3, and gas bag 5 forming a prefabricated installation module 6, held in place at its lateral body part 7. On a vertical wall section of a trim part 8 located in front of installation module 6, an outlet opening 9 is provided for inflated gas bag 5, with outlet opening 9 being covered by a lid 10 (FIG. 2) when gas bag 5 is in the folded resting position.

In the illustrated embodiment, installation module 6 is fastened to an interior panel of a door, and trim part 8 located in front is formed by the interior trim of the door. Installation module 6 however could also be mounted on a fixed side wall, with trim part 8 then being formed by side trim located in front.

According to the invention, cover 10 in the embodiment comprises an external frame part 11 fastened to adjoining trim part 8 as well as two lid halves 12, 13 located one on top the other and formed integrally with frame part 11. The lid halves 12, 13 are connected at the end facing outer frame part 11, with the exception of the upper and lower hinge areas, by a weakened point 14 (tear line) to outer frame part 11. In the vicinity of weakened point 14, the wall thickness is approximately between zero and 0.4 mm, while the wall thickness in the hinge areas is approximately 0.8 to 1.2 mm. In a common approximately horizontal connecting area 15, the two lid halves 12, 13 are spaced with a small distance between them (gap 16); at intervals of approximately 60 mm, the two lid halves 13 are connected together by a plurality of narrow upright connecting ribs 17. Both lid halves 12, 13 are provided on the side facing passenger compartment 18 with a decorative covering 19. Covering 19 is made of leather, artificial leather, film, or the like.

According to one preferred embodiment, covering 19 consists of two halves 20, 21 connected together adjacent to common connecting area 15 of the two lid halves 12, 13 by an approximately horizontally directed tear seam 22. Tear seam 22 forms a desired breaking point when gas bag 5 is inflated.

However, a one-piece covering 19 could also be provided that has a desired breaking point adjacent to common connecting area 15. The desired breaking point can be formed for example by a laser tear seam provided internally on covering 19.

In the illustrated embodiment, cover 10 is formed by a one-piece injection-molded part approximately 2.5 mm thick made of SANTOPRENE™. However, other suitable materials could be used to make cover 10. To achieve a specific pivoting movement of lid halves 12, 13 when gas bag 5 unfolds, thin-walled retaining panels 23, 24 are provided internally on the two lid halves 12, 13, said panels connecting in each case external frame part 11 with the adjoining lid half 12 or 13 in addition to the hinge area.

Each retaining panel 23, 24 made of thin-walled aluminum sheet comprises an elongate mounting flange 25, 25' that abuts the side of lid half 12, 13 facing away from passenger compartment 18 and is permanently attached thereto by a plurality of ultrasonic welds 29. Mounting flange 25, 25' is adjacent to a relatively narrow hinge section 26, 26', connected with an external retaining section 27, 27'. Retaining section 27, 27' abuts the rear of external frame part 11. At least one U-shaped loop section 28, 28' of the retaining section is guided around the exterior of frame part 11 (hooked connection). The surrounding frame part 11 of cover 10 is connected at a number of locations with adjoining covering part 8 by ultrasonic welds 30. For this purpose, circular or rectangular openings 31, 32 are provided locally on frame part 11 and on retaining panels 23, 24, through which openings the projecting pin-like welding domes or welding tabs 34 of trim part 8 can be inserted. The projecting areas of welding domes or welding tabs 34 are then welded using ultrasound, resulting in a solid connection between frame part 11 of cover 10 and trim part 8.

Figure 5:
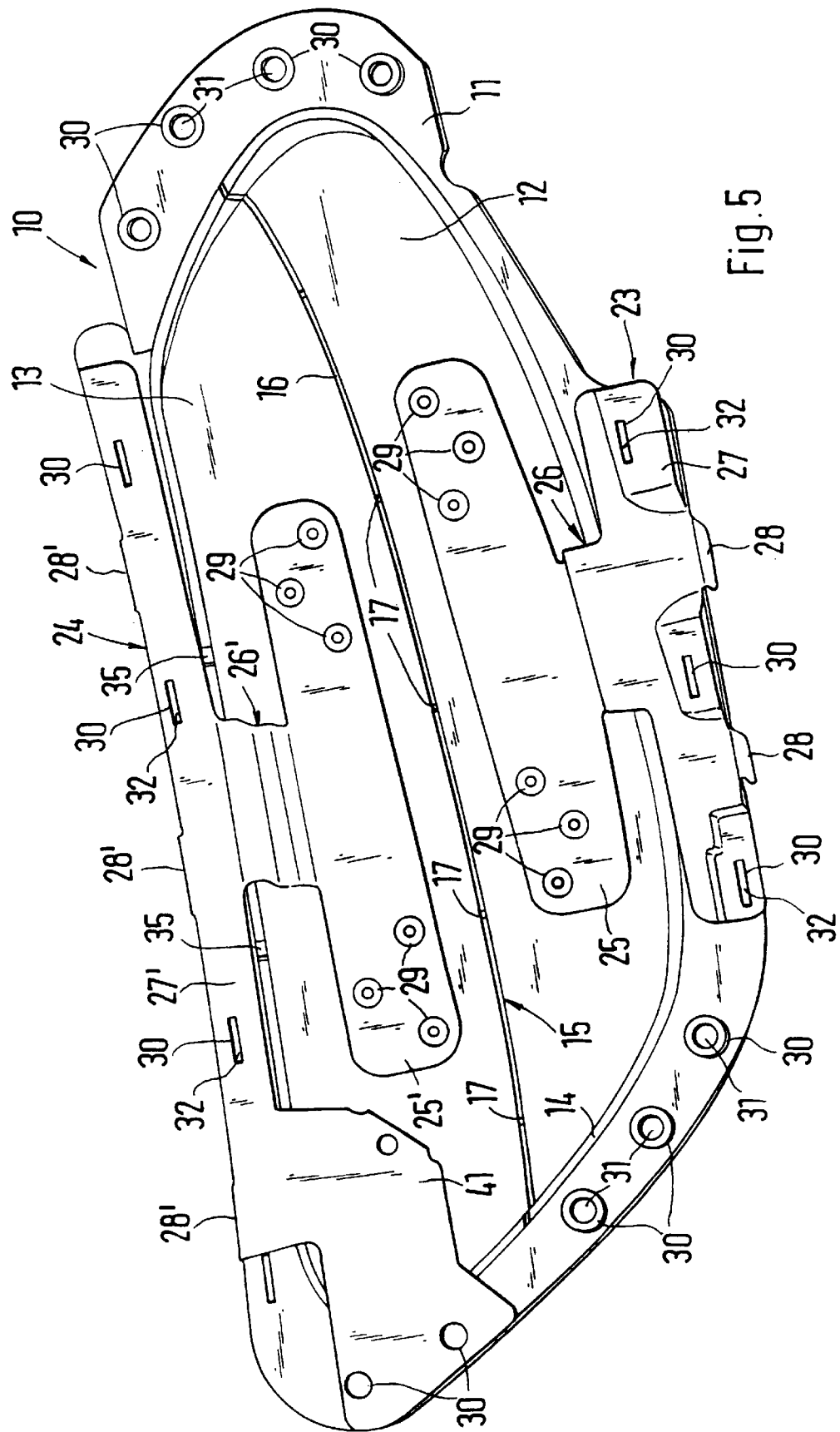
FIG. 5 is a view of the cover looking in the direction of arrow S in FIG. 2.

On both sides of the respective hinge section 26, 26', tear stoppers 35 are provided between frame part 11 and adjoining lid halves 12, 13, said stoppers being formed by upright ribs in the vicinity of weakening 14 (FIG. 5).

In addition, upper lid section 12, on both sides of hinge section 26 of retaining panel 23, has several upright reinforcing ribs (not shown in greater detail).

Figure 3:
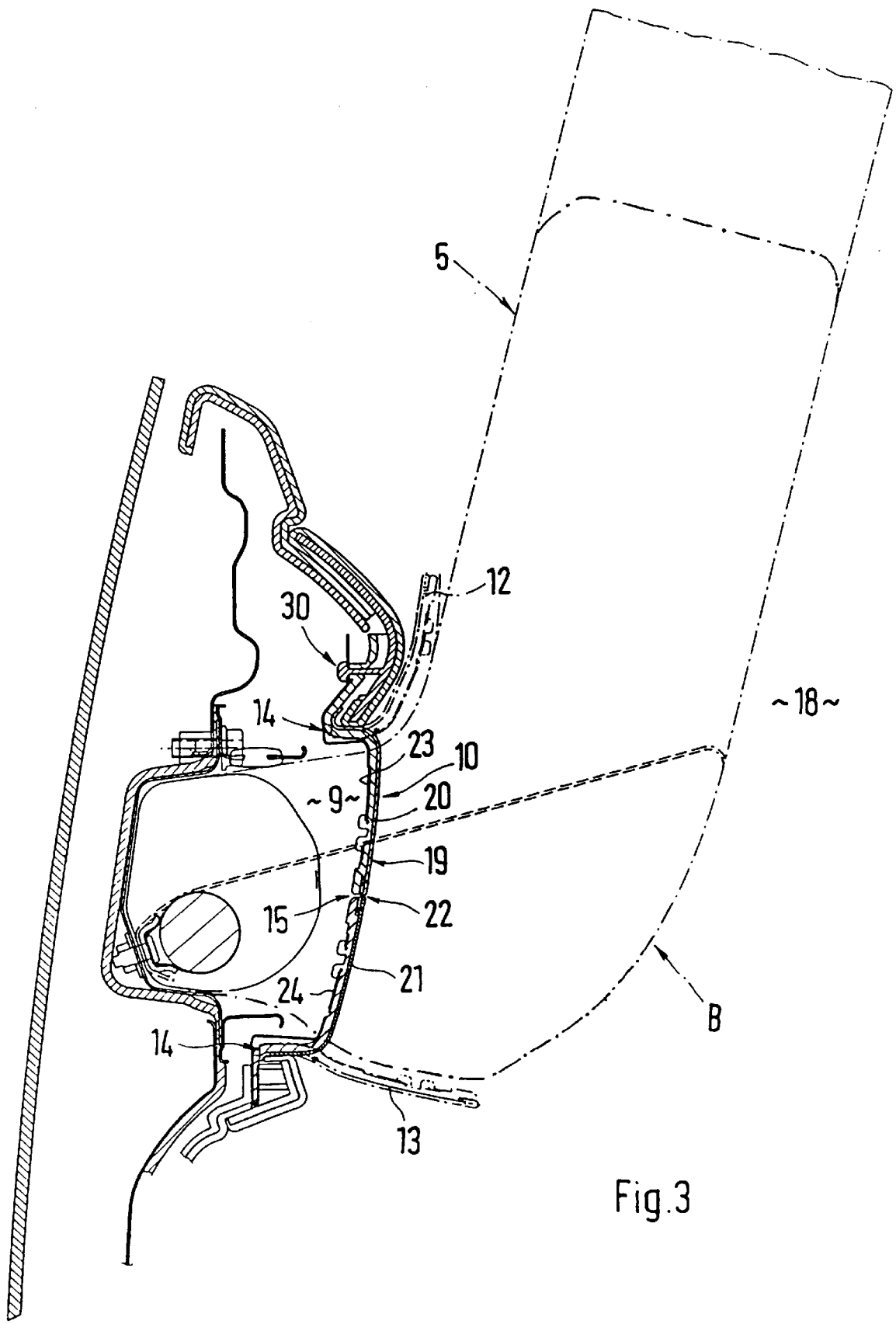
FIG. 3 is a section along line III—III in FIG. 1 with the side impact protection device in the operating position.
Figure 4:
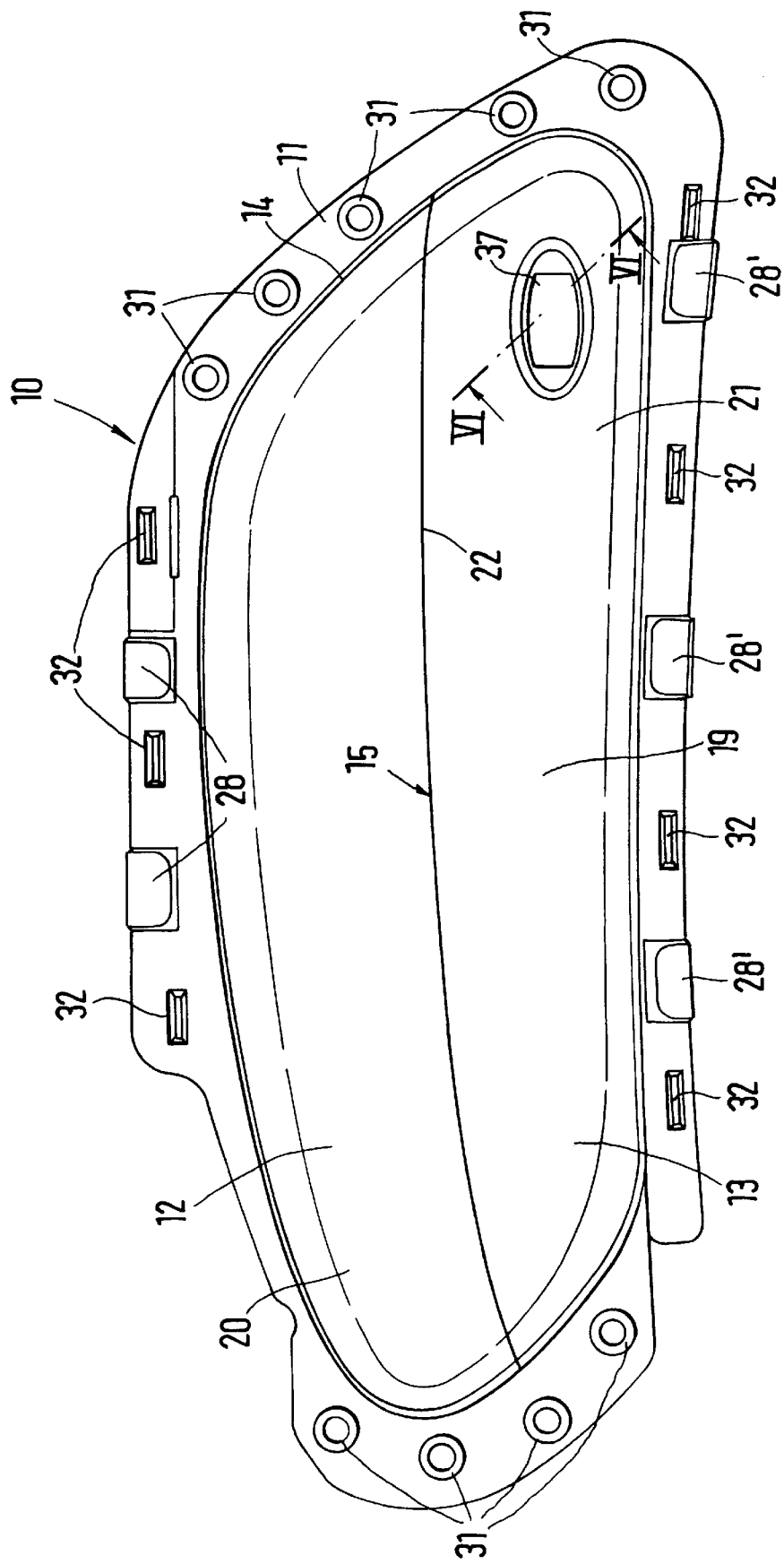
FIG. 4 is a view of the cover looking in the direction of arrow R in FIG. 2.
Figure 6:
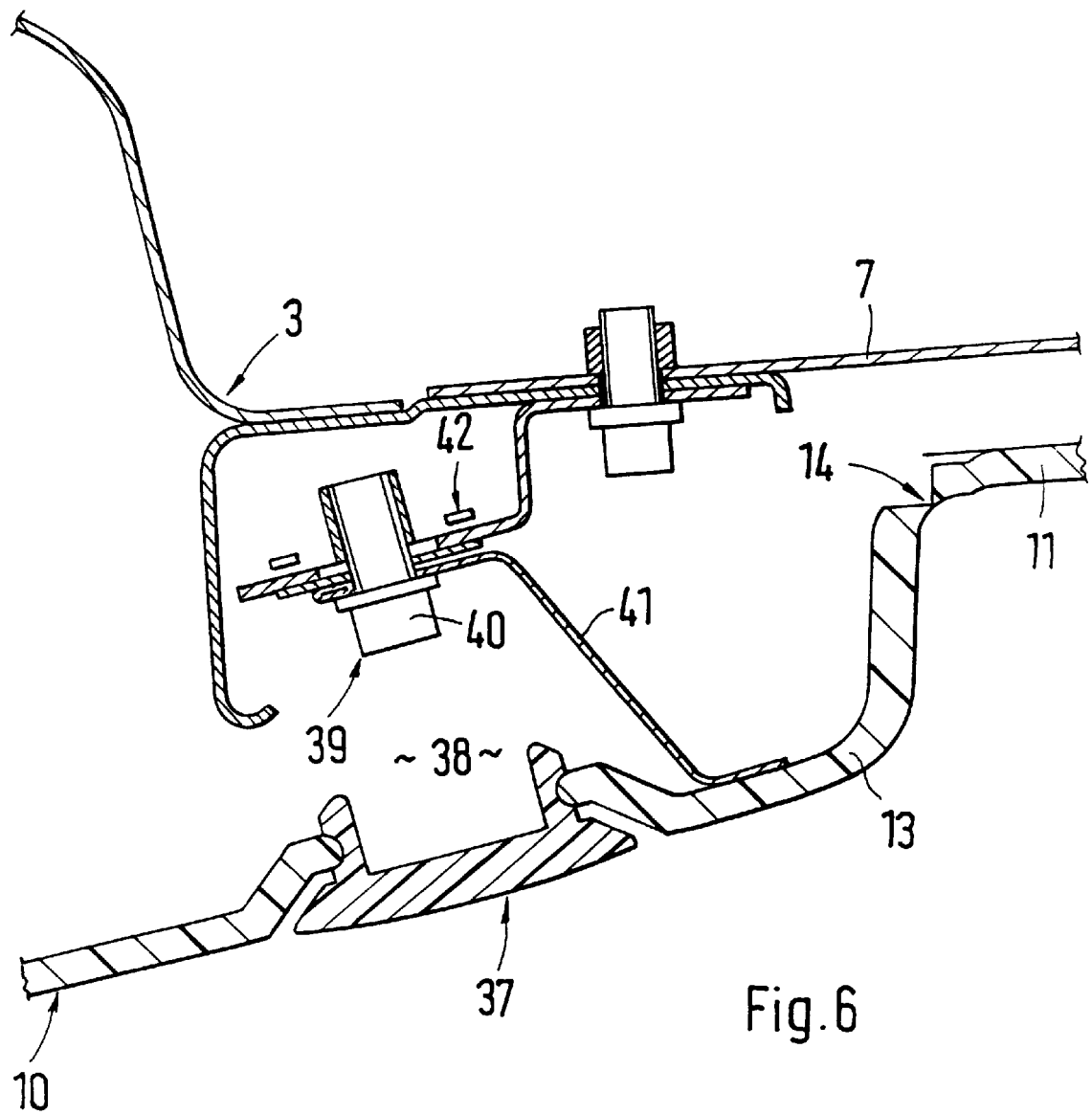
FIG. 6 is a section along line VI—VI in FIG. 4.

On lower lid half 13, a mounting opening 38 is provided in a forward area that can be closed by a plug 37, through which opening a mounting bolt 39 for cover 10 can be inserted. A screw head 40 abuts a projection 41 on lower retaining panel 24, and mounting bolt 39 is screwed into a plug nut 42 of housing 3 (FIG. 6). The two lid halves 13 assume the positions shown by the dot-dashed lines in FIG. 3 when gas bag 5 is inflated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A side impact protection device for an occupant of a vehicle, comprising:
    an inflatable gas bag;
    a vertical wall section of a trim part defining an outlet opening for the gas bag; and
    a cover closing said outlet opening with the gas bag in a folded resting position, said cover including an outer frame part mounted on the trim part and at least two pivotable lid halves formed integrally with the outer frame part, said lid halves being provided on a side facing a passenger compartment with a decorative covering, a tear seam being provided in a common connecting area of said lid halves on the covering.

2. A side impact protection device according to claim 1, wherein said lid halves include an upper hinge area and a lower hinge area, and outside of said hinge areas said lid halves are connected by a surrounding weakened line with the outer frame part.

3. A side impact protection device according to claim 1, wherein proximate the tear seam, the two lid halves are spaced with a gap between them, the two lid halves being joined together proximate the tear seam by narrow, upright connecting ribs.

4. A side impact protection device according to claim 1, wherein between the outer frame part and the adjoining lid halves, tear stoppers in the form of upright ribs are provided opposite said common connecting area.

5. A side impact protection device according to claim 1, wherein a separate cover part is provided for each lid half, the separate cover parts being connected together by said tear seam.

6. A side impact protection device according to claim 1, wherein a one-piece covering is provided for the two lid halves, said tear seam being produced by a laser in said common connecting area.

7. A side impact protection device according to claim 1, wherein thin-walled retaining panels are provided internally on the two lid halves, each of said panels being connected with the outer frame part and the adjoining lid half.

8. A side impact protection device according to claim 7, wherein each of said retaining panels is connected by at least one ultrasonic weld with the adjoining lid half.

9. A side impact protection device according to claim 7, wherein each of said retaining panels includes at least one U-shaped loop section guided around the exterior of the outer frame part.

10. A side impact protection device according to claim 9, wherein each of said retaining panels has a mounting flange that is elongate and is connected with a respective one of said lid halves, said mounting flange being connected by a relatively narrow hinge section with an outer retaining section, said U-shaped loop sections being provided on said outer retaining section.

11. A side impact protection device according to claim 7, wherein one of said lid halves defines a mounting opening for receiving a plug, through which opening a mounting screw can be inserted to fasten the retaining panel located behind to a housing of the gas bag.

12. A side impact protection device according to claim 10, wherein the outer frame part of the cover and the outer retaining section of the two retaining panels is secured to the adjoining trim part by ultrasonic welding.

13. A side impact protection device according to claim 10, wherein a plurality of reinforcing ribs running vertically are located on an upper one of said lid halves on both sides of said hinge section of the retaining panel.

14. A side impact protection device according to claim 1, wherein said trim part is formed by door trim.

15. A side impact protection device according to claim 1, wherein said cover is formed by a one-piece injection-molded part made of thermoplastic rubber.

* * * * *